(No Model.)
S. ARNOLD.
UNIVERSAL JOINT.
No. 410,570. Patented Sept. 10, 1889.
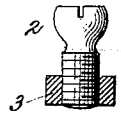
Fig. 1.
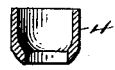
Fig. 2.
Fig. 3.
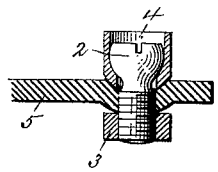
Fig. 4.
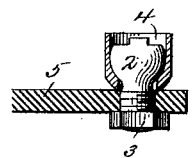
Fig. 5.
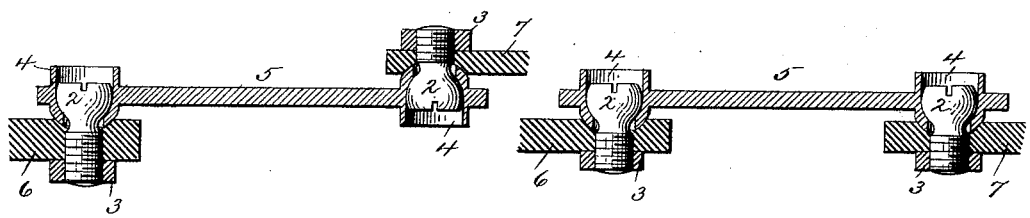
Fig. 6.  Fig. 6ᵃ.
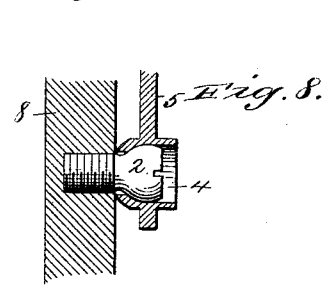
Fig. 7.  Fig. 8.
Witnesses:
E. D. Smith
H. V. Cushman
Inventor:
S. Arnold,
By his Attorney
Henry Calver

UNITED STATES PATENT OFFICE.

SATTERLEE ARNOLD, OF MORRISTOWN, NEW JERSEY.

UNIVERSAL JOINT.

SPECIFICATION forming part of Letters Patent No. 410,570, dated September 10, 1889.

Application filed May 31, 1889. Serial No. 312,730. (No model.)

*To all whom it may concern:*

Be it known that I, SATTERLEE ARNOLD, a citizen of the United States, residing at Morristown, in the county of Morris and State of New Jersey, have invented certain new and useful Improvements in Universal Joints, of which the following is a specification, reference being had therein to the accompanying drawings.

The object of my invention is to provide a novel universal or ball joint which will permit of a free and easy movement of the parts composing the joint and the parts connected thereby, and which affords positive means for taking up wear.

To this end my improved joint comprises a cup or socket bushing and a screw-stud, the latter having a threaded stem and what may be termed a "ball-head," this head being preferably about a hemisphere or two-thirds of a sphere, but may be more or less, the essential features of the head being that it has a convex or rounded hemispherical under portion or the portion next its stem, and a slot or nick or equivalent indentation or projection for the reception of a screw-driver or wrench. The bottom part of the cup or bushing has concave and convex inner and outer surfaces, which are parallel with each other and also with the under rounded portion of the ball-head of the stud, the said head and bushing being ground together to form a perfectly-fitted joint. The cup or socket bushing may be formed upon or integral with the pitman or other moving part of the machine to which the joint is to be applied, or it may be a separate and independent part, and in the latter instance the pitman or part to which the joint is applied may have a concave recess to receive the convex face of the bushing, and also a convex face on its side opposite said recess. The threaded stem of the ball-headed stud is usually provided with a set-nut to securely hold the parts to proper adjustment, and when said set-nut is screwed up or unscrewed the stud is held by a screw-driver inserted in the nick of the head, or the set-nut may be held by a wrench and the stud turned by the screw-driver.

In the drawings, Figure 1 is a detail view of the ball-stud with the set-nut thereon. Fig. 2 is a section of an independent cup or socket bushing. Fig. 3 is a detail section of a portion of an arm or pitman. Fig. 4 shows the parts represented in Figs 1, 2, and 3 assembled together. Fig. 5 is a view similar to Fig. 4, with a plain pitman. Figs. 6 and 6ª show the cups or bushings formed integral with pitmen. Fig. 7 shows the form of bushing represented by Fig. 6, with the pitman connected to a bar like the needle-bar of a sewing-machine. Fig. 8 is a view similar to Fig. 6, with the stem of the stud screwed into the bar and the lock-nut omitted.

2 denotes the ball-headed stud having a screw-threaded stem, and 3 a set-nut on the latter, the head of the said stud having a suitable nick or equivalent recess or projection for the reception of a screw-driver or other tool by which it may be held or turned.

4 is a cup or socket bushing having a concave inner face and parallel outer convex face, the inner face of said bushing and under convex face of the head of the stud being ground or fitted together to form a perfect joint with parallel contiguous faces. The cup or bushing 4 may be an independent part, as shown in Figs. 2, 4, 5, and 8, or it may be formed integral with the pitman or other moving part 5, to which the joint is to be applied, as shown in Figs. 6, 6ª, 7, and 8. The pitmen shown in Figs. 6 and 6ª are represented as connecting two arms or levers 6 and 7. The parts against which the convex faces of the cups or bushings 4 are to bear will preferably be formed with concave sockets or recesses, as shown in Figs. 4, 6, 6ª, 7, and 8, to receive the convex faces of the said cups or bushings; but the parts against which the said cups or bushings are to bear may be plain, as in Fig. 5. The arms or pitmen 5 (shown in Figs. 4, 5, and 8) are or may be tapped for the reception of the threaded stem of the ball-studs, as are also the arms 6 and 7 in Figs. 6 and 6ª, and the bars 8 shown in Figs. 7 and 8.

From the foregoing description and the accompanying illustrations, it will be clear that I provide a strong and freely-moving universal joint, the parts of which are easily assembled, and in which the wear may be readily taken up. In practice the stud and cup or bushing will preferably be of hardened steel, so that the wear will be as little as possible. The constructions shown enable the parts to move freely on each other, and are thus adapted to permit of free movements of connected parts in different planes, as where a part, as a needle-bar 8, is reciprocated in a vertical plane and is operated from a vibrating lever, the end of which, describing a curve in its vibrations, is connected by a pitman 5 to said bar, or where movements of parts in planes at right angles to each other are desirable or necessary.

The set-nut on the threaded stem of the stud always holds the parts securely to adjusted positions, and the nicked or projection-carrying head of the ball-stud affords means for turning or holding said stud in adjusting or in tightening or loosening the set-nut.

Having thus described my invention, I claim and desire to secure by Letters Patent—

1. In a universal joint, the combination, with a stud having a threaded stem and a head with a convex under or inner surface and a slotted or nicked upper or outer face, of a cup or socketed bushing having an inner concave face and an outer convex face, said faces being parallel with each other and with the convex face of the head of said stud, and a pitman or other moving part to which the stem of said stud is attached.

2. In a universal joint, the combination, with a stud having a threaded stem and a head with a convex under or inner surface and a slotted or nicked upper or outer face, of a cup or socketed bushing having an inner concave face and an outer convex face, said faces being parallel with each other and with the convex face of the head of said stud, and a pitman or other moving part to which the stem of said stud is attached, and which is provided with a concave seat in which the convex face of the said bushing fits.

3. In a universal joint, the combination, with a stud having a threaded stem and a head with a convex under or inner surface and a slotted or nicked upper or outer face, of a cup or socketed bushing having an inner concave face and an outer convex face, said faces being parallel with each other and with the convex face of the head of said stud, a set-nut on said threaded stem, and a pitman or other moving part to which the stem of said stud is attached.

4. The combination, with a headed stud having a threaded stem and nicked head, the part of which head adjacent to said stem is convex, of a pitman or similar moving part having opposite concave and convex faces, and a set-nut on the said threaded stem.

In testimony whereof I affix my signature in presence of two witnesses.

SATTERLEE ARNOLD.

Witnesses:
CHARLES DIPPLE,
HENRY E. HUTCHINSON.